United States Patent [19]

Stephens

[11] Patent Number: 4,461,145
[45] Date of Patent: Jul. 24, 1984

[54] STALL ELIMINATION AND RESTART ENHANCEMENT DEVICE

[75] Inventor: Frederick D. Stephens, Lake Park, Fla.

[73] Assignee: The United States of America as represented by the Secretary of the Air Force, Washington, D.C.

[21] Appl. No.: 433,561

[22] Filed: Oct. 8, 1982

[51] Int. Cl.³ .............................................. F02K 3/075
[52] U.S. Cl. .................................................. 60/226.3
[58] Field of Search ................. 60/226.1, 226.2, 226.3, 60/39.23, 39.29, 262; 137/15.1, 15.2

[56] References Cited

U.S. PATENT DOCUMENTS

| | | | |
|---|---|---|---|
| 2,781,634 | 2/1957 | Moore | 60/35.6 |
| 2,873,576 | 2/1959 | Lombard | 60/226.3 |
| 3,070,131 | 12/1962 | Wheatley | 60/39.23 |
| 3,514,212 | 5/1970 | Herbst | 415/23 |
| 3,671,134 | 6/1972 | Boothe | 415/13 |
| 3,854,286 | 12/1974 | Klees | 60/204 |
| 3,868,625 | 2/1975 | Speigner et al. | 340/27 SS |
| 3,948,469 | 4/1976 | Brown | 60/226.1 X |
| 4,069,661 | 1/1978 | Rundell et al. | 60/205 |
| 4,080,785 | 3/1978 | Koff et al. | 60/262 X |
| 4,214,440 | 7/1980 | Rucker | 60/226.3 |
| 4,261,686 | 4/1981 | Weiler | 60/226.1 X |
| 4,275,560 | 6/1981 | Wright et al. | 60/226.3 |
| 4,285,194 | 8/1981 | Nash | 60/262 X |
| 4,292,802 | 10/1981 | Snow | 60/226.3 X |

Primary Examiner—Carlton R. Croyle
Assistant Examiner—Jeffrey A. Simenauer
Attorney, Agent, or Firm—Donald J. Singer; John R. Flanagan

[57] ABSTRACT

Stall elimination means in a jet turbofan engine includes a plurality of pairs of generally parallel case struts arranged in an annular row in an annular fan bypass duct of the engine, and a series of freely-rotatable vanes, each vane disposed between a pair of the struts and movable between open and closed positions. In its open position, each vane is aligned with the direction of normal, positive air flow in the duct, while in its closed position it extends generally across the duct and blocks most reverse air flow in the duct. The vane automatically rotates to the closed position in response to the onset of an adverse pressure gradient in the duct.

4 Claims, 2 Drawing Figures

STALL ELIMINATION AND RESTART ENHANCEMENT DEVICE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to a gas turbine engine and, more particularly, is concerned with a device to clear or eliminate a stall stagnation and to improve starting thereafter in a turbofan engine.

2. Description of the Prior Art

Various means have been used to detect and prevent stall in the compressors of gas turbine engines. Patents to Moore, U.S. Pat. No. 2,781,634; Herbst, U.S. Pat. No. 3,514,212; Boothe, U.S. Pat. No. 3,671,134; and Speigner et al U.S. Pat. No. 3,868,625, illustrate various transducer systems for detecting the onset of surge or stall in the fan or compressor portion of the engine in time for corrective action to be taken to prevent complete engine flow breakdown or stagnation.

Fan or compressor surge or stall occurs when the fan or compressor attempts to operate at a pressure (or pressure ratio) against which it cannot provide positive (in the normal direction) flow. At this condition the onset of surge or stall occurs.

Fan engines have two principle problem areas. First, they are susceptible to fan surge or stall due to the happening of augmentor anomalies, such as blowout followed by relight or mislights, and resultant core engine stagnation. Second, they experience small relight windows (relative to a normal turbojet engine) due to the low airflow resistance through the fan duct relative to the core engine. Consequently, inlet airflow passes around the core engine rather than through it where the airflow is needed to obtain relight core speed.

However, for the fan or compressor of a turbofan engine to stall there are three conditions which must be present. First, there must be a member of the system that can store energy and return it (like a spring). In the F100 engine, this is the gaseous volume downstream of the fan or compressor. Second, the airflow must be free to travel in either direction, i.e., no check valves. Third, there must be some kind of disturbance in the system to initiate the problem, such as augmentor blowout or augmentor mislight, followed by ignition and resultant pressure spike. If any one of these conditions is absent, surge will not occur.

A need exists for a solution to the aforementioned problems which does not require a transducer to sense the onset of surge or stall and then, in turn, cause actuation of something else to prevent or correct the problem. The time delay between sensing of surge and actuation of corrective measures may be unacceptable.

SUMMARY OF THE INVENTION

The present invention proposes to solve the first problem relating to the causes of fan or compressor surges by eliminating the second condition of the three required for surge to occur. Specifically, the present invention provides a check valve downstream of the fan. The check valve takes the form of a series of free floating airfoil-shaped vanes which cooperate with radial struts in the vicinity of the intermediate case of the fan duct to prevent reverse flow through the duct.

The present invention also proposes to solve the second problem relating to core engine relight with the same basic configuration of vanes by merely adding an actuation device that forces the vanes to their closed positions in the event of loss of main burner ignition in the combustor of the engine. With the vanes forced to closed positions, all incoming airflow would be forced through the core engine, thereby reducing the time required to accelerate the compressor to ignition speed.

Accordingly, the present invention is directed to stall elimination and restart enhancement means mounted in the fan bypass duct of a turbofan engine. The stall elimination means is comprised of a series of free floating airfoil-shaped vanes disposed between pairs of parallel struts arranged in an annular row in the bypass duct. Each vane is mounted for rotation about a radially extending axis relative to the centerline of the engine between an open position in which it is aligned with positive air flow in the bypass duct, generally parallel with the pairs of struts, and a substantially closed position in which the vane extends generally across the duct with its opposite edges contacting the respective struts. A reverse air flow in the duct will move each vane to the closed position substantially blocking the reverse flow and causing more air to thereby enter the core engine.

For enhancement of core engine restart, the vanes each have an actuation device, such as a spring, which forces the vanes to their closed or check valve position in the event of loss of main burner ignition. The actuator does not interfere with the vane moving to the closed position during fan or compressor surge. With the vanes forced to the closed position, substantially all the incoming flow is forced through the core engine, thereby reducing the time required to accelerate the compressor to ignition speed. Since the vanes are spring loaded toward the check valve position, they close automatically at low pressure conditions, but are full open for normal operating conditions. It will be realized that the vanes have the advantage that no separate sensor is required to sense a stall condition and actuate the vanes to their check valve positions.

DETAILED DESCRIPTION OF THE INVENTION

Figure 1:
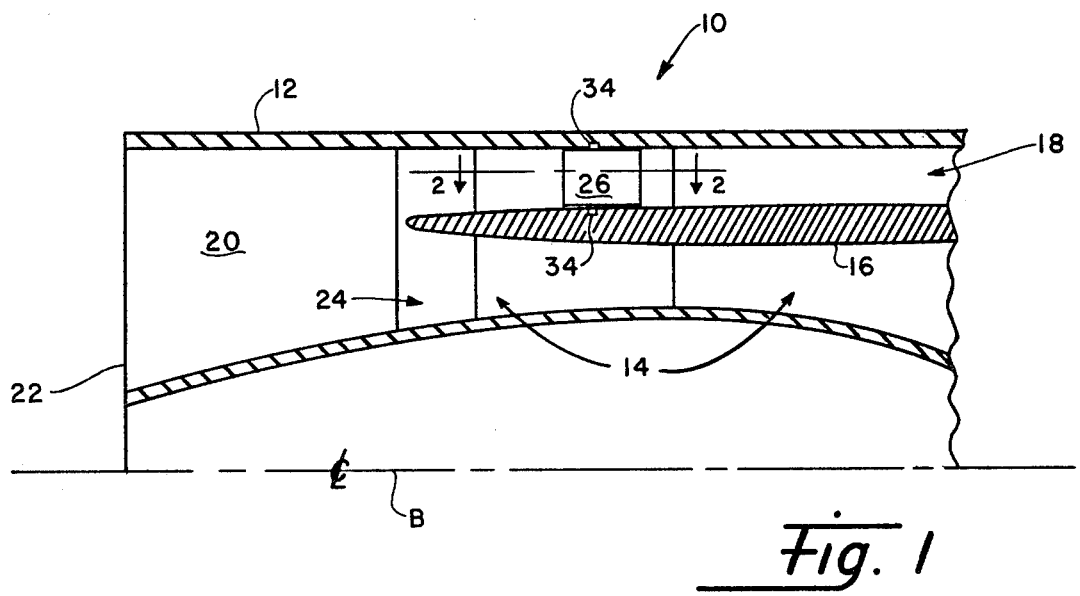
FIG. 1 is a fragmentary schematical view of a turbofan engine which incorporates the stall elimination and restart enhancement means of the present invention.

Referring now to the drawings, and more particularly to FIG. 1, there is shown in schematic form a portion of a typical axial flow turbofan engine, generally designated 10. The turbofan engine 10 has an outer annular casing 12 spaced apart from an inner core engine 14 by an inner annular splitter member 16 so as to define an annular fan by-pass duct 18 therebetween, concentric to the core engine 14. The engine 10 includes a fan section 20 which receives air flow through an inlet 22 whereupon the air is compressed by means of rotating fan blades and fixed stators. A portion of the compressed air is delivered to the core engine 14 and the remainder is directed to the fan bypass duct 18.

The core engine 14 includes an axial flow compressor, combustor and turbine, all arranged in serial flow relationship. Air pressurized by the fan section 20 enters the compressor through an inlet duct 24 where it is compressed. It is then discharged to the combustor where fuel is burned to provide high energy combustion gases which drive the turbine. The turbine operates to extract energy from the core gas flow exiting from the combustor, and to convert some of this energy into power for driving the compressor. Downstream of the core engine an area (not shown) is provided for exhausting the fan bypass duct air flow and core gas flow separately, or for mixing both flows together prior to discharge. Propulsive force is obtained by the discharge of the separate or mixed flows through an exhaust nozzle.

Figure 2:
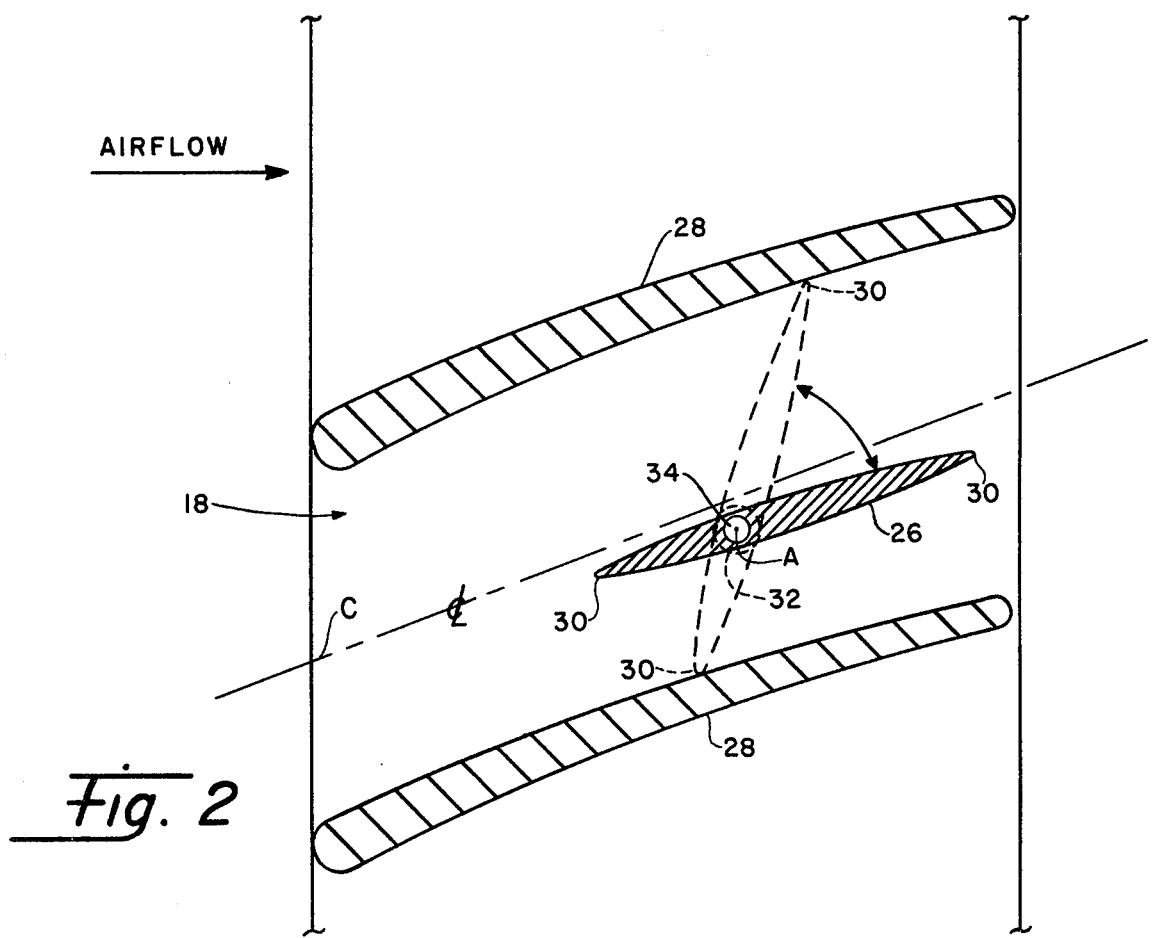
FIG. 2 is an enlarged partial plan layout of an annular fan duct of the turbofan engine taken along line 2—2 of FIG. 1, showing one of the series of free floating airfoil-shaped vanes of the present invention.

The problems of fan or compressor stall and of core engine relight are solved in the turbofan engine 10 by the provision of stall elimination and restart enhancement means mounted in the fan bypass duct 18 of the engine. The stall elimination means is comprised of a series of free floating airfoil-shaped vanes 26, one of which is shown in FIG. 2, disposed between pairs of parallel case struts 28 (a single pair being seen also in FIG. 2), with each strut mounted in the general direction of air flow through the duct 18. Together the struts 28 are arranged in an annular row in the bypass duct 18. Each vane 26 is mounted for rotation about a radially extending axis A relative to the centerline B of the engine 10 between an open position (shown in solid line form in FIG. 2) and a substantially closed or check valve position (shown in broken line form in FIG. 2). In the open position, each vane 26 is generally aligned with positive air flow in the bypass duct 18, generally parallel with the pairs of struts 28. In the substantially closed position, each vane 26 extends generally across the duct 18 with its opposite edges 30 contacting the facing surfaces of the respective struts 28. A reverse air flow in the duct 18 will rotatably move each vane 26 to its closed position so as to substantially block most of the reverse air flow through duct 18. This causes more inlet air to thereby enter the core engine.

As seen in FIG. 2, the free floating vanes 26 are each attached with respect to the center of pressure of its airfoil shape such that the vane freely aligns with air flow in the normal direction, but rotates to provide a check valve in the duct 18 if air flow attempts to reverse due to adverse pressure gradient. Furthermore, the pivotal axis of each vane may be offset from the centerline C of flow for increasing the rapidity of its closure movement.

For enhancement of core engine restart, each vane 26 may be provided with an actuation device, such as a spring 32 shown schematically in FIG. 2, arranged about either end of a central shaft 34 mounting the vane 26 between the engine casing 12 and splitter member 16. The spring will force the vane to its closed or check valve position in the event of loss of main burner ignition due to air pressure drop. With each vane 26 forced to the closed position, substantially all incoming air flow is forced through the core engine which reduces the time required to accelerate the compressor to ignition speed. Since the vanes 26 are spring loaded or biased toward their closed or check valve positions, they close automatically at onset of low pressure conditions but are full open for normal operating pressure conditions.

While the spring loaded vanes serve a dual use, stall elimination and enhanced restart, it should be noted that use of free floating vanes as a solution to the stall and stagnation problem does not require implementation of bias or spring loading for solution of the restart problem. In other words, the vanes are useful independent of the actuation device.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In a jet turbofan engine having an axial flow central core engine surrounded by an inner wall and a fan bypass duct concentric with said core engine and defined between said inner wall and an outer wall, stall elimination means, comprising:
   pairs of generally parallel struts arranged in an annular row and individually in the general direction of air flow through said bypass duct; and
   a series of freely-rotatable airfoil-shaped vanes, each vane disposed between one of said pairs of struts and mounted between said inner and outer walls for rotation between an open position in which it is aligned with positive air flow in the bypass duct, generally parallel with said pair of struts, and a substantially closed position in which it extends generally across the duct blocking most reverse air flow in said bypass duct.

2. The stall elimination means as recited in claim 1, wherein each vane is rotatable about the center of pressure of its airfoil shape such that it freely aligns with air flow in the normal, positive direction, but rotates to provide a check valve in said duct if air flow reverses due to an adverse pressure gradient.

3. The stall elimination means as recited in claim 1, wherein each vane is rotatable about an axis which is offset from the centerline of flow in said duct which increases the rapidity of the rotational movement of said vane to its closed position.

4. The stall elimination means as recited in claim 1, further comprising actuation means operably connected with each vane for biasing said vane toward its closed position such that it will close automatically at onset of a low pressure condition in said duct, but will resume its open position in response to normal operating pressure conditions.

* * * * *